United States Patent
Lee et al.

(10) Patent No.: US 10,106,670 B2
(45) Date of Patent: Oct. 23, 2018

(54) POLYMER RESIN COMPOSITION AND VINYLIDENE FLUORIDE-BASED POLYMER MOLDED PRODUCT

(71) Applicant: LOTTE CHEMICAL CORPORATION, Seoul (KR)

(72) Inventors: Jin Won Lee, Daejeon (KR); Bum Jin Park, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 15/328,116

(22) PCT Filed: Nov. 24, 2014

(86) PCT No.: PCT/KR2014/011326
§ 371 (c)(1),
(2) Date: Jan. 23, 2017

(87) PCT Pub. No.: WO2016/013726
PCT Pub. Date: Jan. 28, 2016

(65) Prior Publication Data
US 2017/0210884 A1    Jul. 27, 2017

(30) Foreign Application Priority Data
Jul. 25, 2014  (KR) ........................ 10-2014-0094925

(51) Int. Cl.
*C08K 5/527*  (2006.01)
*B01D 71/34*  (2006.01)
(Continued)

(52) U.S. Cl.
CPC .............. *C08K 5/527* (2013.01); *B01D 69/08* (2013.01); *B01D 71/34* (2013.01); *B01D 71/82* (2013.01);
(Continued)

(58) Field of Classification Search
USPC .................................. 524/117, 545; 252/500
See application file for complete search history.

(56) References Cited

U.S. PATENT DOCUMENTS

| | | | | |
|---|---|---|---|---|
| 5,653,693 A | * | 8/1997 | Miwa ........................ | A61J 1/06 524/117 |
| 6,585,819 B2 | | 7/2003 | Zhao | |

(Continued)

FOREIGN PATENT DOCUMENTS

| | | |
|---|---|---|
| EP | 0562119 | 5/2000 |
| EP | 1209190 | 5/2002 |

(Continued)

OTHER PUBLICATIONS

Liu et al., Effects of Nucleating Agents on the Morphologies and Performances of Poly(vinylidene fluoride) Microporous Membranes vis Thermally Induced Phase Separation. (J. Appl. Polym. Sci., vol. 128, pp. 836-844 (2013)).*
PCT Search Report & Written Opinion, Patent Cooperation Treaty, Application No. PCT/KR2014/011326, dated Apr. 8, 2015.

*Primary Examiner* — Mark Kaucher
*Assistant Examiner* — Henry Hu
(74) *Attorney, Agent, or Firm* — Lex IP Meister, PLLC

(57) ABSTRACT

The present invention relates to a polymer resin composition including: a vinylidene fluoride-based polymer resin; and one or more types of nucleating agents selected from the group consisting of an organic phosphate and a $C_5$-$C_{15}$ bicycloalkane substituted with one or more carboxylic acid metal salt functional groups, and a polymer resin molded product prepared using the polymer resin composition.

9 Claims, 2 Drawing Sheets

Comparative Example

Example 1

(51) Int. Cl.
*C08K 5/49* (2006.01)
*C08K 5/56* (2006.01)
*C08L 27/16* (2006.01)
*B01D 69/08* (2006.01)
*C08K 5/098* (2006.01)
*D01F 6/12* (2006.01)
*B01D 71/82* (2006.01)
*B29C 47/30* (2006.01)
*B29C 47/00* (2006.01)
*B29K 27/00* (2006.01)
*B29B 9/06* (2006.01)

(52) U.S. Cl.
CPC .......... *B29C 47/0011* (2013.01); *B29C 47/30* (2013.01); *C08K 5/098* (2013.01); *C08K 5/49* (2013.01); *C08K 5/56* (2013.01); *C08L 27/16* (2013.01); *D01F 6/12* (2013.01); *B01D 2325/14* (2013.01); *B01D 2325/34* (2013.01); *B29B 9/06* (2013.01); *B29C 47/0014* (2013.01); *B29C 47/0066* (2013.01); *B29K 2027/16* (2013.01); *B29K 2995/0077* (2013.01); *B29K 2995/0082* (2013.01); *B29K 2995/0089* (2013.01); *D10B 2505/04* (2013.01)

(56) References Cited

U.S. PATENT DOCUMENTS

| | | | |
|---|---|---|---|
| 7,338,692 B2 * | 3/2008 | Smith | B01D 67/0009 428/304.4 |
| 2003/0094409 A1 | 5/2003 | Minegishi | |
| 2008/0113242 A1 | 5/2008 | Smith | |
| 2010/0015376 A1 | 1/2010 | Bonnet | |
| 2012/0041122 A1 | 2/2012 | Hidaka | |
| 2013/0005878 A1 | 1/2013 | Hsu | |
| 2016/0215120 A1 * | 7/2016 | Henry | C08F 14/22 |
| 2016/0347917 A1 * | 12/2016 | Urushihara | C08K 5/098 |

FOREIGN PATENT DOCUMENTS

| | | |
|---|---|---|
| EP | 1209190 A1 * | 5/2002 |
| JP | 05-222078 | 8/1993 |
| JP | 2007-505185 | 3/2007 |
| JP | 2009-533515 | 9/2009 |
| JP | 5062798 | 10/2012 |
| KR | 10-2002-0019078 | 3/2002 |
| KR | 10-2010-0106025 | 10/2010 |
| KR | 10-2012-0001808 | 1/2012 |
| KR | 10-2012-0001970 | 1/2012 |
| KR | 10-2013-0016153 | 2/2013 |
| KR | 10-2013-0110848 | 10/2013 |
| KR | 10-2014-0033206 | 3/2014 |

* cited by examiner

Comparative Example

Example 1

POLYMER RESIN COMPOSITION AND VINYLIDENE FLUORIDE-BASED POLYMER MOLDED PRODUCT

TECHNICAL FIELD

The present invention relates to a polymer resin composition and a vinylidene fluoride-based polymer molded product. More particularly, the present invention relates to a polymer resin composition which can not only improve a degree of crystallization and crystallinity while securing high impact strength, thereby improving mechanical strength, heat resistance, and chemical resistance, but also minimize post-shrinkage occurring after molding and greatly reduce molding or processing time, and a vinylidene fluoride-based polymer resin molded product obtained from the polymer resin composition.

BACKGROUND OF ART

A vinylidene fluoride-based polymer resin is a fluorine-based resin which is excellent in mechanical properties, weather resistance, chemical resistance, electrochemical stability, flame resistance, etc., and is widely used in various industries such as for paints, electronic products, films, and separation membranes.

The vinylidene fluoride-based polymer resin is a semi-crystalline polymer resin composed of a crystalline region and an amorphous region, and in particular, the degree of crystallization of the semi-crystalline polymer resin affects overall physical properties and characteristics thereof.

Generally, it is known that as the degree of crystallization of a semi-crystalline polymer resin increases, the mechanical strength, heat resistance, and chemical resistance or the like are improved.

Recently, in this technical field, there has been an increasing demand for a technique for manufacturing polyvinylidene resin compositions and molded products having excellent strength and chemical resistance in an efficient manner.

For example, Korean Patent Laid-open Publication No. 2013-0110848 discloses a method of improving crystallinity through multi-stage heat treatment processing such as heating, cooling, and sintering in order to obtain a highly crystalline polyvinylidene resin, and there is a detriment in that it takes a lot of time to complete the final manufacturing.

In addition, Korean Patent Laid-open Publication No. 10-2013-0016153 discloses a method of manufacturing a high strength hollow fiber membrane by improving the crystallinity of a polyvinylidene resin through a stretching process, but in the manufacturing method of such a hollow fiber membrane, a heat treatment step for obtaining sufficient crystallinity at the stage before stretching is essential.

Therefore, there is a need to develop a method capable of providing a polyvinylidene resin composition and a molded product having excellent physical properties through simplified processes and simple methods.

PRIOR ART DOCUMENT

Patent Document (Patent Document 1) Korean Patent Laid-open Publication No. 10-2013-0110848

(Patent Document 2) Korean Patent Laid-open Publication No. 10-2013-0016153

DETAILED DESCRIPTION OF THE INVENTION

Technical Problem

In order to solve the problems of the prior arts, it is an object of the present invention to provide a polymer resin composition which can not only improve the degree of crystallization and crystallinity while securing high impact strength, thereby improving mechanical strength, heat resistance, and chemical resistance, but also minimize post-shrinkage occurring after molding and greatly reduce molding or processing time.

It is another object of the present invention to provide a vinylidene fluoride-based polymer resin molded product which can not only improve the degree of crystallization and crystallinity while securing high impact strength, thereby improving mechanical strength, heat resistance, and chemical resistance, but also minimize post-shrinkage occurring after molding and greatly reduce molding or processing time.

Technical Solution

In order to achieve these objects, the present disclosure provides a polymer resin composition including; a vinylidene fluoride-based polymer resin; and one or more types of nucleating agents selected from the group consisting of an organic phosphate and a $C_5$-$C_{15}$ bicycloalkane substituted with one or more carboxylic acid metal salt functional groups.

Also, the present disclosure provides a vinylidene fluoride-based polymer resin molded product including a melt extrudate of the polymer resin composition.

Hereinafter, the polymer resin composition and the vinylidene fluoride-based polymer resin molded product according to specific embodiments of the present invention will be described in more detail.

According to one embodiment of the present invention, a polymer resin composition including: a vinylidene fluoride-based polymer resin; and one or more types of nucleating agents selected from the group consisting of an organic phosphate and a $C_5$-$C_{15}$ bicycloalkane substituted with one or more carboxylic acid metal salt functional groups, can be provided.

Previously, in order to increase the crystallization degree of the vinylidene fluoride-based polymer resin, a multi-stage heat treatment process step has been performed, but there was a limit in that it takes a lot of time to achieve a sufficient degree of crystallization during the heat treatment process.

Therefore, the present inventors conducted studies on improvement of physical properties of a vinylidene fluoride-based polymer resin, and found through experiments that, when using the above-mentioned specific nucleating agent (one or more compounds selected from the group consisting of an organic phosphate and a $C_5$-$C_{15}$ bicycloalkane substituted with one or more carboxylic acid metal salt functional groups) together with a vinylidene fluoride-based polymer resin, the crystallization degree and the crystallization rate of the vinylidene fluoride-based polymer resin can be promoted and the size of the crystal can be miniaturized, thereby improving physical properties such as tensile strength, flexural modulus, strength, and chemical resistance of the vinylidene fluoride-based polymer resin. The present invention has been completed on the basis of such finding.

The above-described polymer resin composition can be obtained by mixing a vinylidene fluoride-based polymer resin, and one or more types of nucleating agents selected from the group consisting of an organic phosphate and a $C_5$-$C_{15}$ bicycloalkane substituted with one or more carboxylic acid metal salt functional groups. In addition, the polymer resin composition may be obtained by melting the above mixed vinylidene fluoride-based polymer resin and nucleating agent at a high temperature, for example, at a temperature of 130° C. to 250° C.

The vinylidene fluoride-based polymer resin may have a crystal structure such as α-type, β-type, and γ-type.

The α-type is thermodynamically most stable, and can have a crystal structure of β-type or γ-type depending on specific processing conditions.

General semi-crystalline polymers exist as a homogeneous polymer that is melted by heat at a higher temperature than the melting point of the polymer, and when they are cooled to a specific crystallization temperature, the internal polymer chains bundle with each other in a specific ordered array to produce a crystal nucleus.

At the center of the crystal nucleus, the polymer chains form a lamella while they are folded in a more ordered array, which grows into spherulite.

Tie molecules form bridges between two or more lamellae, and the tie molecules further fill the lamellae to make the structure more robust.

This is the cause of imparting the mechanical strength of the semi-crystalline polymer.

Generally, the number of tie molecules increases as the molecular weight increases, and the number increases as the crystallization rate increases.

When a common pure polymer is cooled in a molten state, its own chains bundle and grow as a nucleus to achieve crystallization, which is called homogeneous nucleation.

At this time, the nucleation rate is a function of the temperature to be supercooled, and when the molten polymer is quickly cooled, a large number of small and fine nuclei are formed at the same time, and conversely, when the molten polymer is cooled slowly, a small number of large spherical crystals are formed.

The present inventors added a specific nucleating agent in order to improve the crystallinity or crystallization of the vinylidene fluoride-based polymer resin which is a semi-crystalline polymer.

The crystallization behavior due to the nucleating agent is referred to as heterogeneous nucleation, and the above nucleating agent serves to form a large number of fine crystals and enhance the crystallization rate.

By using the above-mentioned nucleating agent, the number of tie molecules in the vinylidene fluoride-based polymer resin may increase rapidly, whereby the mechanical properties of the above vinylidene fluoride-based polymer resin can be greatly increased.

As described above, the nucleating agent may be a $C_5$-$C_{15}$ bicycloalkane substituted with one or more carboxylic acid metal salt functional groups, an organic phosphate, or a mixture of two or more thereof.

The organic phosphate may include an aromatic phosphate ester metal salt, and the organic phosphate may include an aromatic phosphate ester metal salt.

The aromatic phosphate ester metal salt means a phosphate ester metal salt containing at least one aromatic functional group having 6 to 20 carbon atoms.

Specifically, the aromatic phosphate ester metal salt may include a compound represented by the following Chemical Formula 1.

[Chemical Formula 1]

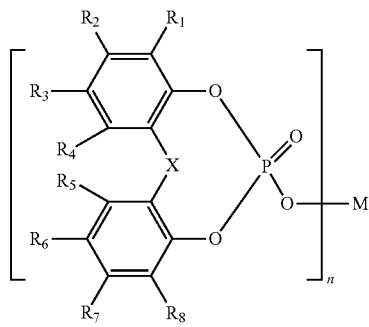

In Chemical Formula 1, $R_1$, $R_2$, $R_3$, $R_4$, $R_5$, $R_6$, $R_7$, and $R_8$ are the same as or different from each, and are each independently hydrogen or a linear or branched alkyl group having 1 to 10 carbon atoms, X is a linear or branched alkylene group having 1 to 5 carbon atoms, and n is 1 or 2.

Also, when n is 1, M is an alkali metal, and when n is 2, M is an alkaline earth metal or hydroxy-aluminum.

Further, in Chemical Formula 1, $R_1$, $R_3$, $R_6$, and $R_8$ are each independently a linear or branched alkyl group having 1 to 10 carbon atoms, and $R_2$, $R_4$, $R_5$, and $R_7$ may be hydrogen.

Specific examples of the compound of Chemical Formula 1 may include compounds represented by the following Chemical Formulas 2 to 6.

[Chemical Formula 2]

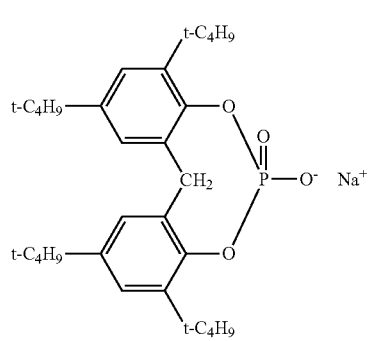

[Chemical Formula 3]

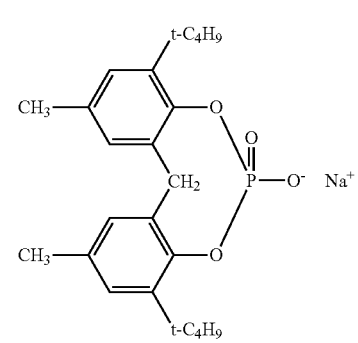

[Chemical Formula 4]

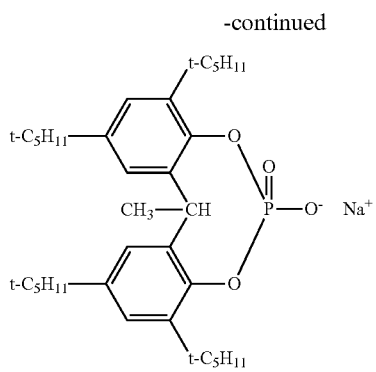

[Chemical Formula 5]

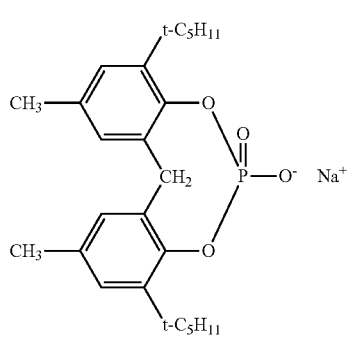

[Chemical Formula 6]

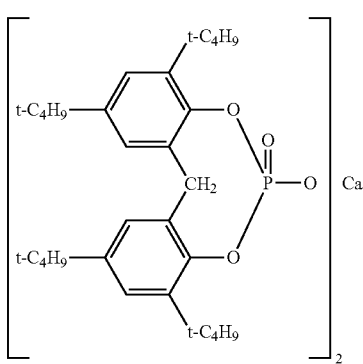

On the other hand, as the nucleating agent, a $C_5$-$C_{15}$ bicycloalkane substituted with one or more carboxylic acid metal salt functional groups can be used.

The carboxylic acid metal salt functional group means a metal carboxylate functional group, and specific examples thereof may include a lithium carboxylate group, a sodium carboxylate group, and a potassium carboxylate group.

The bicycloalkane means a compound in which two aliphatic rings are bonded, and specific examples of the bicycloalkane having 5 to 15 carbon atoms include bicyclo[2.2.1]heptane and bicyclo[2.2.2]octane.

Specifically, the $C_5$-$C_{15}$ bicycloalkane substituted with one or more carboxylic acid metal salt functional groups may include bicyclo[2.2.1]heptane or bicyclo[2.2.2]octane substituted with one to four functional groups selected from the group consisting of a lithium carboxylate group, a sodium carboxylate group, and a potassium carboxylate group.

The polymer resin composition may include 0.01 to 5 parts by weight of the nucleating agent relative to 100 parts by weight of the vinylidene fluoride-based polymer resin.

If the content of the nucleating agent relative to the vinylidene fluoride-based polymer resin is too small, the effect due to the use of the nucleating agent (for example, the crystallization degree and the crystallization rate of the vinylidene fluoride-based polymer resin are promoted and the size of the crystal is miniaturized, or physical properties such as tensile strength, flexural modulus, strength, and chemical resistance of the vinylidene fluoride-based polymer resin are improved) may be insignificant.

In addition, if the content of the nucleating agent relative to the vinylidene fluoride-based polymer resin is too high, the amount of the nucleating agent remaining in the vinylidene fluoride-based polymer resin is increased such that the nucleating agent may be aggregated in the resin and unevenly distributed, and further the function of promoting the crystallization degree and the crystallization rate of the vinylidene fluoride-based polymer resin or miniaturizing the size of the crystal may be rather inhibited.

On the other hand, the above-mentioned vinylidene fluoride-based polymer resin means a polymer or copolymer containing a vinylidene fluoride repeating unit. Specifically, the vinylidene fluoride-based polymer resin may include a vinylidene fluoride homopolymer, a vinylidene fluoride copolymer, and a mixture thereof.

The vinylidene fluoride copolymer includes a copolymer of vinylidene fluoride monomer and other monomers such as tetrafluoroethylene, hexafluoropropylene, ethylene trifluoride, or trifluorochloroethylene.

The vinylidene fluoride-based polymer resin may have a weight average molecular weight of 100,000 to 1,000,00, 250,000 to 800,000, or 300,000 or 600,000.

If the weight average molecular weight of the vinylidene fluoride-based polymer resin is too small, the mechanical properties, chemical resistance, and the like of the polymer resin composition or the resin molded product produced therefrom are not sufficiently secured.

In addition, if the weight average molecular weight of the vinylidene fluoride-based polymer resin is too large, the viscosity of the polymer resin composition is too high, which may make it difficult to produce a resin molded product, and the nucleating agent may not be uniformly dispersed.

The vinylidene fluoride-based polymer resin can have a melt index (230° C., load of 5 kg) of 0.1 to 30 g/10 min.

On the other hand, the polymer resin composition of one embodiment of the invention may further include additives that can be typically added to the polymer resin, in consideration of the use or desired physical properties of the resin molded product produced therefrom.

For example, the polymer resin composition of one embodiment of the invention may further include at least one additive selected from the group consisting of an antioxidant, a lubricant, a heat resistant agent, a UV stabilizer, a neutralizing agent, a pigment, a scratch resistance improving agent, and a deodorant.

On the other hand, according to another embodiment of the present invention, a vinylidene fluoride-based polymer resin molded product including a melt extrudate of the polymer resin composition may be provided.

As described above, when using a specific nucleating agent (one or more compounds selected from the group consisting of an organic phosphate and a $C_5$-$C_{15}$ bicycloalkane substituted with one or more carboxylic acid metal salt functional groups) together with a vinylidene fluoride-based polymer resin, the crystallization degree and the crystallization rate of the vinylidene fluoride-based polymer resin can be promoted and the size of the crystal can be miniaturized, whereby a resin molded product having physical properties such as high tensile strength, flexural modulus, strength, and chemical resistance can be provided.

The vinylidene fluoride-based polymer resin molded product can be obtained by melting and extruding the above-described polymer resin composition at a temperature of 130° C. to 250° C. Further, it can undergo an injection molding process.

The contents relating to the vinylidene fluoride-based polymer resin and the nucleating agent include those described above in the polymer resin composition of one embodiment.

The flexural modulus of the vinylidene fluoride-based polymer resin molded product measured according to ASTM D790 may be 20,000 kgf/cm² or more, or 20,000 kgf/cm² to 25,000 kgf/cm².

The tensile strength of the vinylidene fluoride-based polymer resin molded product measured according to ADTM D638 may be 530 kgf/cm² or more, or 530 kgf/cm² to 560 kgf/cm².

The vinylidene fluoride-based polymer resin molded product may have relative crystallinity of 60% to 75%.

This relative crystallinity can be determined by the ratio of the area of a crystalline peak to the sum of the area of the crystalline peak and an area of an amorphous peak in the X-ray diffraction analysis (XRD) data.

The vinylidene fluoride-based polymer resin molded product can be produced and used in applications such as polymer films, separation membranes, hollow fiber membranes, or various injection molded products and extrusion molded products.

Advantageous Effects

According to the present invention, a polymer resin composition which can not only improve the degree of crystallization and crystallinity while securing high impact strength, thereby improving mechanical strength, heat resistance, and chemical resistance, but also minimize post-shrinkage occurring after molding and greatly reduce molding or processing time, and a vinylidene fluoride-based polymer resin molded product, may be provided.

DETAILED DESCRIPTION OF THE EMBODIMENTS

Figure 1:
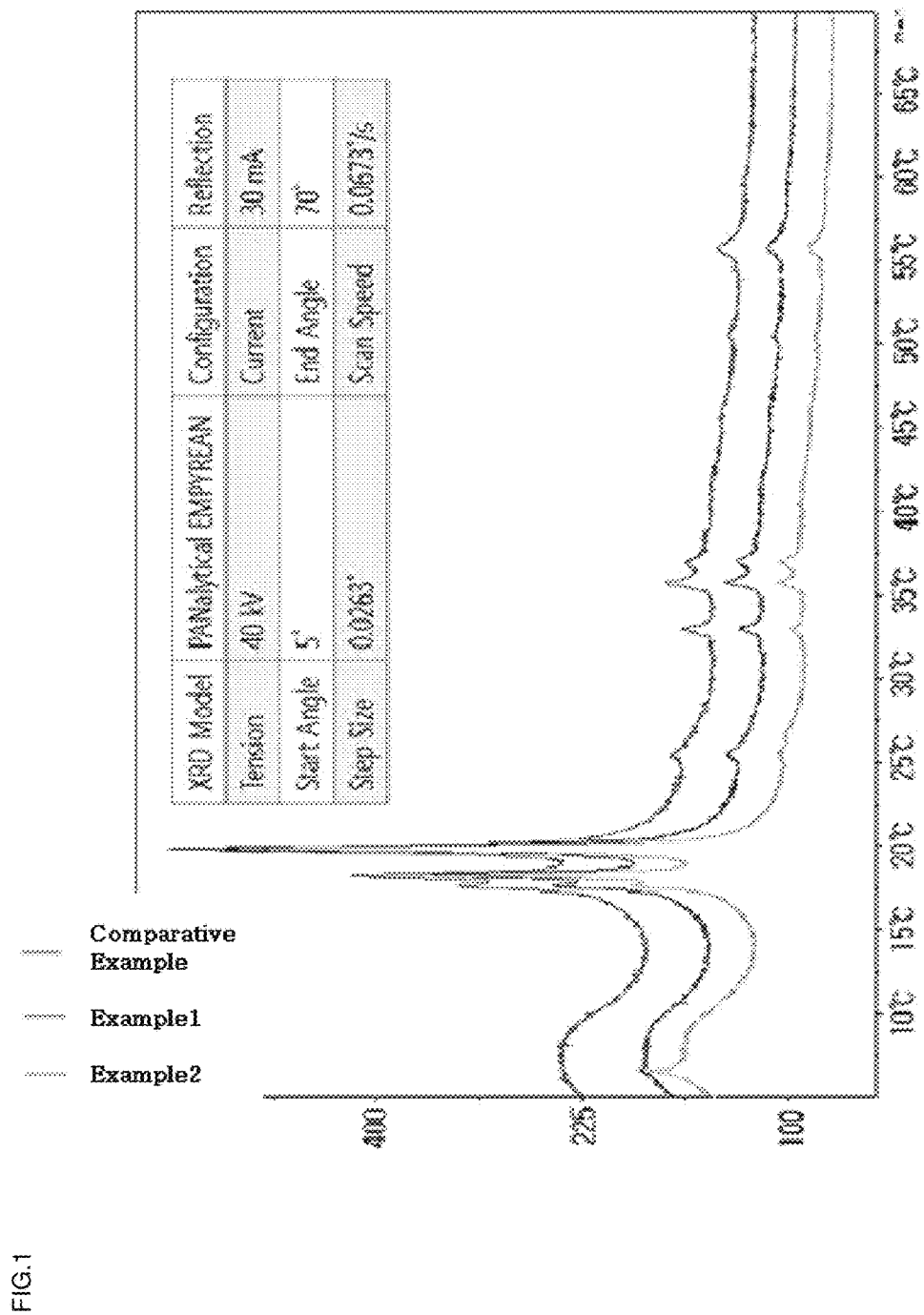
FIG. 1 shows an XRD graph obtained in Experimental Example 3.

Hereinafter, the present invention will be described in more detail in the following examples. However, these examples are for illustrative purposes only, and the contents of the invention are not intended to be limited by these examples.

EXAMPLES AND COMPARATIVE EXAMPLES: PREPARATION OF VINYLIDENE FLUORIDE-BASED POLYMER RESIN MOLDED PRODUCT

Example 1

0.3 parts by weight of a vinylidene fluoride-based polymer resin [melt index (230° C., load of 5 kg): about 10 g/10 min] and an aromatic phosphoric acid ester metal salt represented by the following Chemical Formula 1 were mixed in a Henschel mixer for 3 min, and then extruded with a twin-screw extruder at about 220° C. to obtain a pellet-shaped resin composition having a diameter of about 1 to 2 mm.

A tensile strength test piece (ASTM D 638), a flexural modulus test piece (ASTM D790), and an Izod impact strength test piece (D258) were prepared from the pellet-shaped resin composition prepared above using a 150 ton molding extrusion machine (DONGSHIN Hydraulics, PRO-150WD).

[Chemical Formula 1]

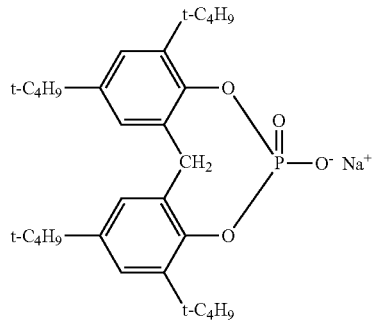

Example 2

The resin molded product and the test piece were prepared in the same manner as in Example 1, except that disodium cis-endo-bicyclo(2.2.1) heptane-2-3-dicarboxylate was used instead of the aromatic phosphoric acid ester metal salt of Chemical Formula 1.

Comparative Example

The resin molded product and the test piece were prepared in the same manner as in Example 1, except that the aromatic phosphoric acid ester metal salt of Chemical Formula 1 was not used.

EXPERIMENTAL EXAMPLES: MEASUREMENT AND OBSERVATION OF PHYSICAL PROPERTIES OF VINYLIDENE FLUORIDE-BASED POLYMER RESIN MOLDED PRODUCT

Experimental Example 1: Measurement of Melting Point (Tm) and Crystallization Temperature (Tc)

The melting point (Tm) and the crystallization temperature (Tc) of the vinylidene fluoride-based polymer resin molded product obtained in the examples and comparative example were measured by using differential scanning calorimetry (DSC).

5 mg of the test pieces obtained in the examples and comparative example were melted at 220° C. for 5 min and then cooled at a cooling rate of 10° C./min in order to completely remove the thermal history, and thereby the crystallization temperature and the generated heat amount were measured. The molded product crystallized at room temperature was again heated to 220° C. at a rate of 10° C./min to measure the melting point and the amount of heat absorbed.

Under these conditions, the crystallization temperature (Tc), the crystallization time (s), and the melting point were measured.

TABLE 1

DSC measurement results

| | Crystallization temperature (Tc) | Crystallization time | Melting point |
|---|---|---|---|
| Comparative Example 1 | 134° C. | 76 s | 170° C. |
| Example 1 | 145° C. | 68 s | 172° C. |
| Example 2 | 138° C. | 73 s | 170° C. |

As shown in Table 1 above, it was confirmed that the vinylidene fluoride-based polymer resin molded products obtained in Examples 1 and 2 had not only a higher crystallization temperature and melting point but also a relatively short crystallization time, as compared with Comparative Example 1.

Specifically, the vinylidene fluoride-based polymer resin molded products obtained in Examples 1 and 2 exhibited a crystallization temperature of 135° C. or more and a melting point of 170° C. or more.

Experimental Example 2: Measurement of Melt Index, Tensile Strength, and Flexural Modulus The melt index, tensile strength, flexural modulus, and Izod impact strength of the vinylidene fluoride-based polymer resin molded products obtained in the examples and comparative example were measured by the methods shown in Table 2 below.

TABLE 2

Measurement results of the melt index, tensile strength and flexural modulus

| | Measurement method | Comparative Example | Example 1 | Example 2 |
|---|---|---|---|---|
| Melt index (g/min) 230° C., 5 kg | ASTM D1238 | 6.6 | 6.0 | 6.2 |
| Tensile strength (kgf/cm²) | ADTM D638 Temperature 23° C./ relative humidity 50% | 520 | 540 | 535 |
| Flexural modulus (kgf/cm²) | ASTM D790 Temperature 23° C./ relative humidity 50% | 19,000 | 21,000 | 20,600 |
| IZOD impact strength (kgf · cm/cm) | ASTM D256 (23° C., 3T) | 28.3 | 28.1 | 28.0 |

As shown in Table 2 above, it was confirmed that the vinylidene fluoride-based polymer resin molded products obtained in Examples 1 and 2 had higher tensile strength and flexural modulus than the resin molded products of the comparative example, and also had equivalent impact strength to that of the comparative example.

Specifically, the vinylidene fluoride-based polymer resin molded products obtained in Examples 1 and 2 had a flexural modulus of 20,000 kgf/cm² and tensile strength of 530 kgf/cm² or more.

Experimental Example 3: Measurement of Relative Crystallinity of the Vinylidene Fluoride-Based Polymer Resin Molded Products X-ray diffraction analysis (XRD) was performed for the vinylidene fluoride-based polymer resin molded products obtained in Examples 1 and 2 by reflection in the temperature range of 0° C. to 70° C., and the relative crystallinity of the vinylidene fluoride-based polymer resin molded products was determined by using the area ratio of the peaks with a generated FWHM of 2.5 or less.

The obtained X-ray diffraction analysis graph is shown in FIG. 1.

TABLE 3

Relative crystallinity measured by XRD

| X-ray diffraction (XRD) | Relative crystallinity (FWHM <2.5) |
|---|---|
| Comparative Example | 52.6% |
| Example 1 | 63.6% |
| Example 2 | 62.2% |

FWHM = Full width at half maximum
Crystallinity = (Area of crystalline peak/(area of crystalline peak + area of amorphous peak) × 100

As shown in Table 3 above, it was confirmed that the vinylidene fluoride-based polymer resin molded products of Examples 1 and 2 had higher relative crystallinity than that of the comparative example, and specifically had relative crystallinity of 60% to 70%.

It was also confirmed that the scattering peaks of the vinylidene fluoride-based polymer resin molded products of Example 1 and Example 2 were stabilized as compared with the α-type X-ray scattering peak of the vinylidene fluoride-based polymer resin molded product of the comparative example.

Experimental Example 4: Observation of Crystal Growth Size Using SEM

The vinylidene fluoride-based polymer resin molded products obtained in the examples and comparative example were observed using a heating stage and SEM.

Specifically, the test pieces of the vinylidene fluoride-based polymer resin molded products obtained in the examples and comparative example were heated up to 220° C. using a heating stage and completely melted for 5 min, followed by isothermal crystallization at 162° C., and the crystallization behavior of the test pieces was measured through SEM.

Figure 2:
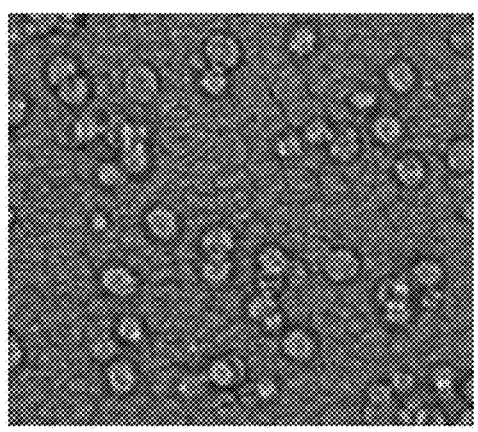
FIG. 2 shows a SEM enlarged image (×100 times) obtained in Experimental Example 4.
Figure 2:
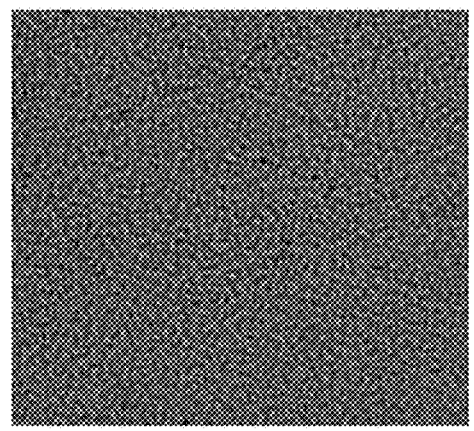

As shown in FIG. 2, it was confirmed that the polymer crystals contained in the vinylidene fluoride-based polymer resin molded products obtained in Example 1 and the comparative example were smaller, whereby in the case of the vinylidene fluoride-based polymer resin molded products of the example, a large number of small crystals were grown to improve the crystallinity and the crystallization temperature as a whole.

The invention claimed is:
1. A polymer resin composition comprising:
a vinylidene fluoride-based polymer resin; and
one or more types of nucleating agents selected from the group consisting of an organic phosphate and a $C_5$-$C_{15}$ bicycloalkane substituted with one or more carboxylic acid metal salt functional groups,
wherein the $C_5$-$C_{15}$ bicycloalkane substituted with one or more carboxylic acid metal salt functional groups includes bicyclo[2.2.1]heptane or bicyclo[2.2.2]octane substituted with one to four functional groups selected from the group consisting of a lithium carboxylate group, a sodium carboxylate group, and a potassium carboxylate group, wherein the organic phosphate includes an aromatic phosphate ester metal salt, wherein the aromatic phosphate ester metal salt includes a compound represented by the following Chemical Formula 1:

[Chemical Formula 1]

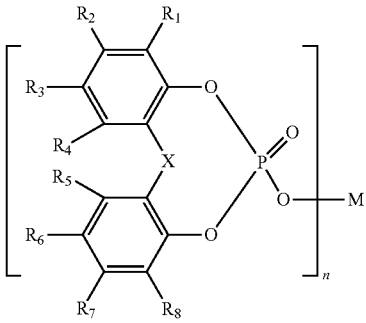

wherein, in Chemical Formula 1, $R_1$, $R_2$, $R_3$, $R_4$, $R_5$, $R_6$, $R_7$, and $R_8$ are the same as or different from each, and are each independently hydrogen or a linear or branched alkyl group having 1 to 10 carbon atoms, X is a linear or branched alkylene group having 1 to 5 carbon atoms, n is 1 or 2, when n is 1, M is an alkali metal, and when n is 2, M is an alkaline earth metal or hydroxy-aluminum, wherein the polymer resin composition includes 0.01 to 5 parts by weight of the nucleating agent relative to 100 parts by weight of the vinylidene fluoride-based polymer resin.

2. The polymer resin composition according to claim 1, wherein the vinylidene fluoride-based polymer resin has a melt index (230° C., load of 5 kg) of 0.1 to 30 g/10 min.

3. The polymer resin composition according to claim 1, wherein the vinylidene fluoride-based polymer resin has a weight average molecular weight of 100,000 to 1,000,000.

4. The polymer resin composition for the preparation of a hollow fiber membrane according to claim 1, comprising one or more selected from the group consisting of a vinylidene fluoride homopolymer and a vinylidene fluoride copolymer.

5. The polymer resin composition according to claim 1, further comprising at least one additive selected from the group consisting of an antioxidant, a lubricant, a heat resistant agent, a UV stabilizer, a neutralizing agent, a pigment, a scratch resistance improving agent, and a deodorant.

6. A vinylidene fluoride-based polymer resin molded product comprising a melt extrudate of the polymer resin composition of claim 1.

7. The vinylidene fluoride-based polymer resin molded product according to claim 6, wherein a flexural modulus of the molded product measured according to ASTM D790 is 20,000 kgf/cm$^2$ or more.

8. The vinylidene fluoride-based polymer resin molded product according to claim 6, wherein tensile strength of the molded product measured according to ADTM D638 is 530 kgf/cm$^2$ or more.

9. The vinylidene fluoride-based polymer resin molded product according to claim 6, wherein relative crystallinity of the molded product is 60% to 75%.

* * * * *